(12) United States Patent
Ogiso (10) Patent No.: US 7,743,608 B2
(45) Date of Patent: Jun. 29, 2010

(54) EXHAUST GAS PURIFYING APPARATUS FOR INTERNAL COMBUSTION ENGINE

(75) Inventor: Makoto Ogiso, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 247 days.

(21) Appl. No.: 12/083,244

(22) PCT Filed: Mar. 9, 2006

(86) PCT No.: PCT/JP2006/305186
§ 371 (c)(1),
(2), (4) Date: Apr. 17, 2008

(87) PCT Pub. No.: WO2006/095917

PCT Pub. Date: Sep. 14, 2006

(65) Prior Publication Data
US 2009/0249770 A1 Oct. 8, 2009

(30) Foreign Application Priority Data
Mar. 9, 2005 (JP) .............................. 2005-065196

(51) Int. Cl.
*F01N 3/00* (2006.01)
(52) U.S. Cl. .............................. 60/295; 60/285; 60/287
(58) Field of Classification Search .................... 60/285, 60/286, 287, 295
See application file for complete search history.

(56) References Cited

U.S. PATENT DOCUMENTS
2005/0153251 A1 * 7/2005 Crawley et al. ................ 431/1

FOREIGN PATENT DOCUMENTS

| | | | |
|---|---|---|---|
| DE | 101 01 593 A1 | | 7/2002 |
| DE | 101 27 669 A1 | | 1/2003 |
| DE | 102 44 137 A1 | | 4/2004 |
| FR | 2825749 A1 | * | 12/2002 |
| FR | 2 846 036 A | | 4/2004 |
| JP | 11-117786 | | 4/1999 |
| JP | 2003-201831 A | | 7/2003 |
| JP | 2004-52641 | | 2/2004 |
| JP | 2004-339973 | | 12/2004 |
| JP | 2005-036663 A | | 2/2005 |

* cited by examiner

OTHER PUBLICATIONS

Hasenclever et al., DE 10,101,593 A1 English Abstract, Jul. 18, 2002.*

*Primary Examiner*—Thomas E. Denion
*Assistant Examiner*—Audrey Klasterka
(74) *Attorney, Agent, or Firm*—Kenyon & Kenyon LLP (57) ABSTRACT

An exhaust gas purifying apparatus for an internal combustion engine includes plural exhaust gas purifying units which are provided on exhaust gas passages connected to plural cylinder groups in the internal combustion engine and purify exhaust gas flowing in the exhaust gas passages, a regeneration determining unit which determines whether or not the plural exhaust gas purifying units should be regenerated, and a regeneration control unit which executes regeneration control for regenerating the exhaust gas purifying units when the regeneration determining unit determines that the exhaust gas purifying units should be regenerated. The regeneration control unit simultaneously executes the regeneration control for the plural exhaust gas purifying units when a change of a combustion mode of the internal combustion engine is involved before and after execution of the regeneration control. Meanwhile, the regeneration control unit independently executes the regeneration control for each of the plural exhaust gas purifying units when the change of the combustion mode is not involved before and after the execution of the regeneration control.

6 Claims, 9 Drawing Sheets

EXHAUST GAS PURIFYING APPARATUS FOR INTERNAL COMBUSTION ENGINE

TECHNICAL FIELD

The present invention relates to an exhaust gas purifying apparatus for an internal combustion engine.

BACKGROUND ART

As an internal combustion engine including plural groups of cylinders (banks) connected to different exhaust gas passages, there is known a V-type engine in which plural groups of cylinders are connected to different exhaust gas passages, respectively, for example. The internal combustion engine of this kind includes a catalyst and a filter for purifying exhaust gas in each of the exhaust gas passages.

For example, Japanese Patent Application Laid-open under No. 11-117786 (Reference-1) discloses a technique, in which a SOx catalyst is provided for each exhaust gas passage connected to each bank and an air-fuel ratio is individually controlled for each bank so that the temperature of the SOx catalyst becomes a regenerating temperature at which the catalyst can be regenerated (activated). Thereby, regeneration control is executed. In addition, Japanese Patent Application Laid-open under No. 2004-52641 (Reference-2) discloses a technique in which, in the V-type engine, the regeneration control of the catalysts is executed after a temperature difference between the catalysts provided in the exhaust gas passages of the respective banks becomes zero. Moreover, Japanese Patent Application Laid-open under No. 2004-339973 (Reference-3) discloses a technique in which, in the V-type engine, a timing of regenerating the catalyst is estimated for each bank, and the regeneration control is executed for each bank.

By the way, the states of the catalysts in the banks do not completely coincide with each other, and hence the regeneration control of the catalysts to be executed may be different between the banks. In this case, the regeneration of the catalysts can be more effectively executed by a method of executing the regeneration control at different timings for each bank as compared with a method of simultaneously executing the regeneration control to the entire banks. However, when the combustion mode is changed before and after the execution of the regeneration control, e.g., when the present combustion mode has to be changed for the purpose of executing the regeneration control, it is not preferable that the regeneration control is executed at the different timings for each bank. For example, if the combustion modes of the banks are changed differently for the purpose of the regeneration control and the regeneration control is executed at the different timings, fuel consumption of the internal combustion engine and drivability may be significantly deteriorated.

However, in the exhaust gas purifying apparatuses according to the above-mentioned Reference-1 to Reference-3, since the regeneration control is independently executed for each bank even when the combustion mode is changed before and after the execution of the regeneration control, the drivability may be deteriorated.

DISCLOSURE OF THE INVENTION

The present invention has been achieved in order to solve the above problems. It is an object of this invention to provide an exhaust gas purifying apparatus for an internal combustion engine capable of preventing deterioration of drivability by changing the regeneration control executed for plural catalysts in accordance with whether or not the combustion mode is changed before and after execution of the regeneration control of the catalysts.

According to one aspect of the present invention, there is provided an exhaust gas purifying apparatus for an internal combustion engine including: plural exhaust gas purifying units which are provided on exhaust gas passages connected to plural cylinder groups in the internal combustion engine and purify exhaust gas flowing in the exhaust gas passages; a regeneration determining unit which determines whether or not the plural exhaust gas purifying units are to be regenerated; and a regeneration control unit which executes regeneration control for regenerating the exhaust gas purifying units when the regeneration determining unit determines that the exhaust gas purifying units are to be regenerated, wherein the regeneration control unit simultaneously executes the regeneration control for the plural exhaust gas purifying units in a case that a change of a combustion mode of the internal combustion engine is involved before and after execution of the regeneration control, and the regeneration control unit independently executes the regeneration control for each of the plural exhaust gas purifying units in a case that the change of the combustion mode is not involved before and after the execution of the regeneration control.

The above exhaust gas purifying apparatus for the internal combustion engine includes the exhaust gas purifying units (e.g., catalyst and filter) provided in each of the exhaust gas passages connected to the plural cylinder groups (banks), the regeneration determining unit which determines whether or not the exhaust gas purifying units should be regenerated, and the regeneration control unit which executes the regeneration control for regenerating (activating) the exhaust gas purifying unit when the exhaust gas purifying units should be regenerated. In detail, the regeneration control unit simultaneously executes the regeneration control for the plural exhaust gas purifying units when the change of the combustion mode is involved before and after the execution of the regeneration control. The regeneration control unit independently executes the regeneration control for each of the plural exhaust gas purifying units when the change of the combustion mode is not involved before and after the execution of the regeneration control. Thereby, since the regeneration of the exhaust gas purifying unit can be appropriately executed, durability of the exhaust gas purifying unit can be improved. At the same time, even if the regeneration control is executed, it becomes possible to prevent fuel consumption of the internal combustion engine and the deterioration of the drivability.

In a manner of the above exhaust gas purifying apparatus for the internal combustion engine, the case that the change of the combustion mode is involved may be a case that at least one of an intake air amount introduced to the cylinder groups, an EGR amount fed back to an intake-air system, an fuel injection amount generating power output and a fuel injection timing is changed. When those amounts are changed before and after the execution of the regeneration control, the regeneration control can be simultaneously executed for the plural exhaust gas purifying units.

In another manner of the above exhaust gas purifying apparatus for the internal combustion engine, the regeneration control unit may execute at least one of reduction of nitrogen oxides (NOx) stored by the exhaust gas purifying units, regeneration of particulate matters (PMs) accumulating in the exhaust gas purifying units and sulfur poisoning recovery in the exhaust gas purifying units.

In still another manner of the above exhaust gas purifying apparatus for the internal combustion engine, the regeneration control unit may determine whether or not the regeneration of the PM ends for each of the plural exhaust gas purifying units, and the regeneration control unit may execute the sulfur poisoning recovery when it is determined that the regeneration of the PM ends in all the exhaust gas purifying units.

In this manner, the exhaust gas purifying apparatus for the internal combustion engine simultaneously executes, for the plural cylinder groups, the regeneration control of the sulfur poisoning recovery after the end of the regeneration control of the PM regeneration. This is because it is necessary to set the temperature of the exhaust gas purifying unit to the temperature much higher than the temperature at the time of the PM regeneration for the purpose of the sulfur poisoning recovery, and normally the PM tends to accumulate more easily than S (sulfur) in the exhaust gas purifying unit, and thus the frequency of executing the sulfur poisoning recovery is smaller than the frequency of executing PM regeneration. By executing the regeneration control, it becomes possible to prevent the deterioration of the fuel consumption of the internal combustion engine. In addition, even if there is a difference of the PM amount accumulating in the respective exhaust gas purifying units, it becomes possible to perform the sulfur poisoning recovery after the PM regeneration for the exhaust gas purifying units securely ends.

In still another manner, the above exhaust gas purifying apparatus for the internal combustion engine may further include an estimation unit which estimates a PM amount accumulating in each of the plural exhaust gas purifying units, and the regeneration control unit may determine a control amount based on an estimated PM amount so that time periods for executing the regeneration control for the plural exhaust gas purifying units become same.

In this manner, the estimation unit estimates the PM amount accumulating in each of the plural exhaust gas purifying units. Based on the PM amount estimated by the estimation unit, the regeneration control unit determines the control amount so that the time periods for executing the regeneration control for the plural exhaust gas purifying units become same. Namely, the regeneration control unit executes the control so that the regeneration control in the plural exhaust gas purifying units simultaneously start and end. Thereby, the useless execution of the regeneration control can be avoided, and the fuel consumption can be ensured. At the same time, the regeneration for the exhaust gas purifying units can be securely executed.

In a preferred example, the control amount may be at least a reducing agent amount added to each of the plural exhaust gas purifying units or an exhaust gas amount supplied to each of the plural exhaust gas purifying units.

BRIEF DESCRIPTION OF THE REFERENCE NUMBER

1 Internal combustion engine (Diesel engine)
2L and 2R Banks
3 Cylinder
4 Intake-air passage
6 Turbo charger of variable nozzle type
10L and 10R Exhaust gas passages
12 ECU
13L and 13R EGR passages
16L and 16R NOx catalysts
17L and 17R DPNRs
18L and 18R First exhaust gas purifying units
19L and 19R Second exhaust gas purifying units
20 Fuel injection valve
21L and 21R Fuel addition valves
22L, 22R, 24L and 24R Exhaust gas temperature sensors
23L and 23R Differential pressure sensors
25L and 25R Air-fuel ratio sensors

BEST MODE FOR CARRYING OUT THE INVENTION

The preferred embodiments of the present invention will now be described below with reference to the attached drawings.

[Configuration of Exhaust Gas Purifying Apparatus for Internal Combustion Engine]

Figure 1:
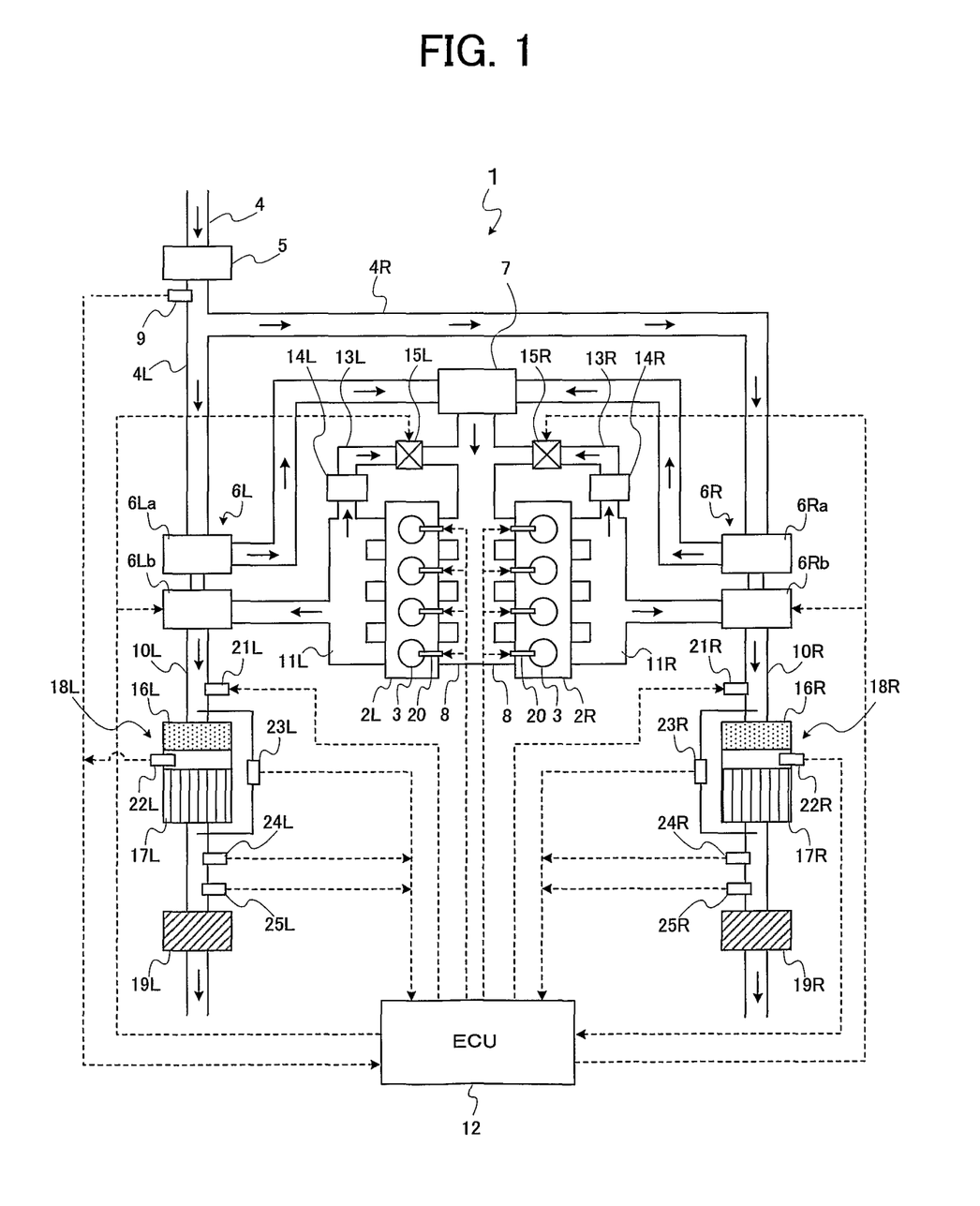
FIG. 1 is a view schematically showing a configuration of an internal combustion engine in which an exhaust gas purifying apparatus according to an embodiment of the present invention is installed.

FIG. 1 shows the internal combustion engine in which the exhaust gas purifying apparatus according to the embodiment of the present invention is installed. In FIG. 1, arrows shown by solid lines show flow of the intake air and the exhaust gas, and arrows shown by broken lines show input-output of signals.

In this embodiment, an internal combustion engine 1 is formed as a V-type 8-cylinder Diesel engine in which each of the left and right banks 2L and 2R has four cylinders 3. The four cylinders 3 of the left bank 2L form one cylinder group, and the four cylinders 3 of the right bank 2R form another cylinder group. The one cylinder group may have at least one cylinder 3.

An intake-air passage 4 introducing the intake air to each of the cylinders 3 is divided into branch passages 4L and 4R for each bank at a downstream position of an air cleaner 5. Compressors 6La and 6Ra of turbo chargers 6L and 6R are arranged in the branch passages 4L and 4R. At downstream positions of the compressors 6La and 6Ra, the branch passages 4L and 4R pass through an inter cooler 7 and are connected to an intake manifold 8 which is common to the branch passages 4L and 4R and which is a part of the intake-air passage 4. An air flow meter 9 for detecting an intake air amount is provided at an upstream position of the branch passages 4L and 4R of the intake-air passage 4.

On the other hand, the exhaust gas from the cylinders 3 of each bank is introduced to turbines 6Lb and 6Rb of the turbo chargers 6L and 6R from exhaust manifolds 11L and 11R of exhaust passages 10L and 10R provided for each bank and is further introduced to downstream positions of the turbines 6Lb and 6Rb. The turbo chargers 6L and 6R are variable nozzle turbo chargers (VN turbo chargers) including a nozzle device (not shown) capable of adjusting an opening degree in the turbines 6Lb and 6Rb. The nozzle opening degree of each of the turbo chargers 6L and 6R is controlled between a full open state and a full shutting state by an ECU (Engine Control Unit) 12. The ECU 12 is a well-known computer which controls a driving state of the internal combustion engine 1 by adjusting fuel injection amount from a fuel injection valve 20 provided in each cylinder 3.

Each of the exhaust manifolds 11L and 11R is connected to the intake manifold 8 via EGR passages 13L and 13R for each bank. EGR coolers 14L and 14R for cooling an EGR gas and EGR valves 15L and 15R for adjusting an EGR flow amount are provided in the EGR passages 13L and 13R, respectively. The ECU 12 controls opening degrees of the EGR valves 15L and 15R so that the appropriate EGR gas amount corresponding to the driving state of the internal combustion engine 1 is supplied to the intake manifold 8. By-pass passages (not shown), in which the exhaust gas flows without passing through the EGR coolers 14L and 14R, and flow-passage switching valves (not shown) which selectively introduce the exhaust gas to the by-pass passages or the EGR coolers 14L and 14R are further provided in the EGR passages 13.

First exhaust gas purifying units 18L and 18R and second exhaust gas purifying units 19L and 19R are provided in the exhaust passages 10L and 10R positioned at the downstream positions of the turbo chargers 6L and 6R. The first exhaust gas purifying units 18L and 18R include NOx catalysts 16L and 16R which store and purify NOx and DPNRs (Diesel Particulate NOx Reduction systems) 17L and 17R functioning as PM filters for collecting PM (Particulate Matter). The second exhaust gas purifying units 19L and 19R are oxidation catalysts.

Fuel addition valves 21L and 21R for adding the fuel to the exhaust gas passages 10L and 10R are provided between the turbines 6Lb and 6Rb and the first exhaust gas purifying units 18L and 18R, respectively. The fuel added from the fuel addition valves 21L and 21R is mainly used as reducing agent at the time of executing regeneration control of the first exhaust gas purifying units 18L and 18R. The regeneration control will be explained later in detail. The ECU 12 controls the fuel amount added by fuel addition valves 21L and 21R.

In addition, differential pressure sensors 23L and 23R for detecting differential pressures of the exhaust gas passages 10L and 10R between the upstream position and the downstream position of the first exhaust gas purifying units 18L and 18R are provided at attachment positions of the first exhaust gas purifying units 18L and 18R, respectively. Moreover, exhaust gas temperature sensors 22L and 22R for detecting temperature of the exhaust gas are provided between the NOx catalysts 16L and 16R and the DPNRs 17L and 17R, respectively. Exhaust gas temperature sensors 24L and 24R for detecting the temperature of the exhaust gas are provided in the exhaust gas passages 10L and 10R between the first exhaust gas purifying units 18L and 18R and the second exhaust gas purifying units 19L and 19R, respectively. Further, air-fuel ratio sensors 25L and 25R for detecting an air-fuel ratio (A/F) of the exhaust gas are provided in the exhaust gas passages 10L and 10R between the first exhaust gas purifying units 18L and 18R and the second exhaust gas purifying units 19L and 19R, respectively. The pressure, temperature and air-fuel ratio detected by these sensors are outputted to the ECU 12.

In the present invention, it is not limited that the fuel added by the fuel addition valves 21L and 21R are used as the reducing agent. Namely, a reducing agent other than the fuel may be used. Moreover, the fuel may be added from the fuel addition valves 21L and 21R and may be injected from the fuel injection valve 20 to the cylinders 3 at timing at which the output power is generated.

Additionally, in the present invention, the arrangements of the first exhaust gas purifying units 18L and 18R and the second exhaust gas purifying units 19L and 19R in the exhaust gas passages 10L and 10R are not limited to the arrangements shown in FIG. 1, either. For example, the second exhaust gas purifying units 19L and 19R may be arranged at an upstream position of the first exhaust gas purifying units 18L and 18R.

[Regeneration Control]

Next, a description will be given of a basic concept of the regeneration control executed for the above-mentioned first exhaust gas purifying units 18L and 18R, according to this embodiment. This control is executed by the ECU 12 functioning as the regeneration control unit. In this embodiment, NOx reduction for the NOx catalysts 16L and 16R, the PM regeneration for the DPNRs 17L and 17R and the sulfur (S) poisoning recovery for the NOx catalysts 16L and 16R are executed as the regeneration control.

Normally, the states of the first exhaust gas purifying units 18L and 18R, which are provided in the exhaust gas passages 10L and 10R of the banks 2L and 2R respectively, do not completely coincide with each other. Thus, the regeneration control to be executed for them may be different for each of the banks 2L and 2R. In this case, the execution of the regeneration control at independent and different timings for each of the banks 2L and 2R, not the simultaneous execution of the regeneration control to the banks 2L and 2R, can realize the effective regeneration of the first exhaust gas purifying units 18L and 18R.

However, when the change of the combustion mode is involved before and after the execution of the regeneration control, e.g., when the change of the present combustion mode is necessary for the purpose of the execution of the regeneration control, if the regeneration control is independently executed for each of the banks 2L and 2R, there is probability that fuel consumption and drivability of the internal combustion engine 1 are significantly deteriorated. Additionally, for example, such control that the combustion mode of one bank is changed for the execution of the regeneration control and the combustion mode of the other bank is not changed cannot be substantially executed because adjustment of explosion torques in the banks 2L and 2R is difficult.

Conversely, when the change of the combustion mode is not involved before and after the execution of the regeneration control for the first exhaust gas purifying units 18L and 18R, no specific problem occurs even if the regeneration control is independently executed for each of the banks 2L and 2R. Rather, if the regeneration control is independently executed for each of the first exhaust gas purifying units 18L and 18R, they can be effectively regenerated.

Therefore, in this embodiment, when the change of the combustion mode is involved before and after the execution of the regeneration control, the regeneration control is simultaneously executed for the banks 2L and 2R. Meanwhile, when the change of the combustion mode is not involved before and after the execution of the regeneration control, the regeneration control is independently executed for each of the banks 2L and 2R. Thereby, the first exhaust gas purifying units 18L and 18R can be appropriately regenerated, and the deterioration of the fuel consumption and drivability of the internal combustion engine 1 can be prevented even if the regeneration control is executed.

Basically, the ECU 12 controls the combustion mode in accordance with the driving state, regardless of the NOx amount, the PM amount and the S-poisoning amount in the first exhaust gas purifying units 18L and 18R. However, if the PM regeneration or the S-poisoning recovery is executed while the combustion mode is being set to the combustion mode with the low exhaust gas temperature, the combustion mode is changed for increasing the exhaust gas temperature.

Figure 2:
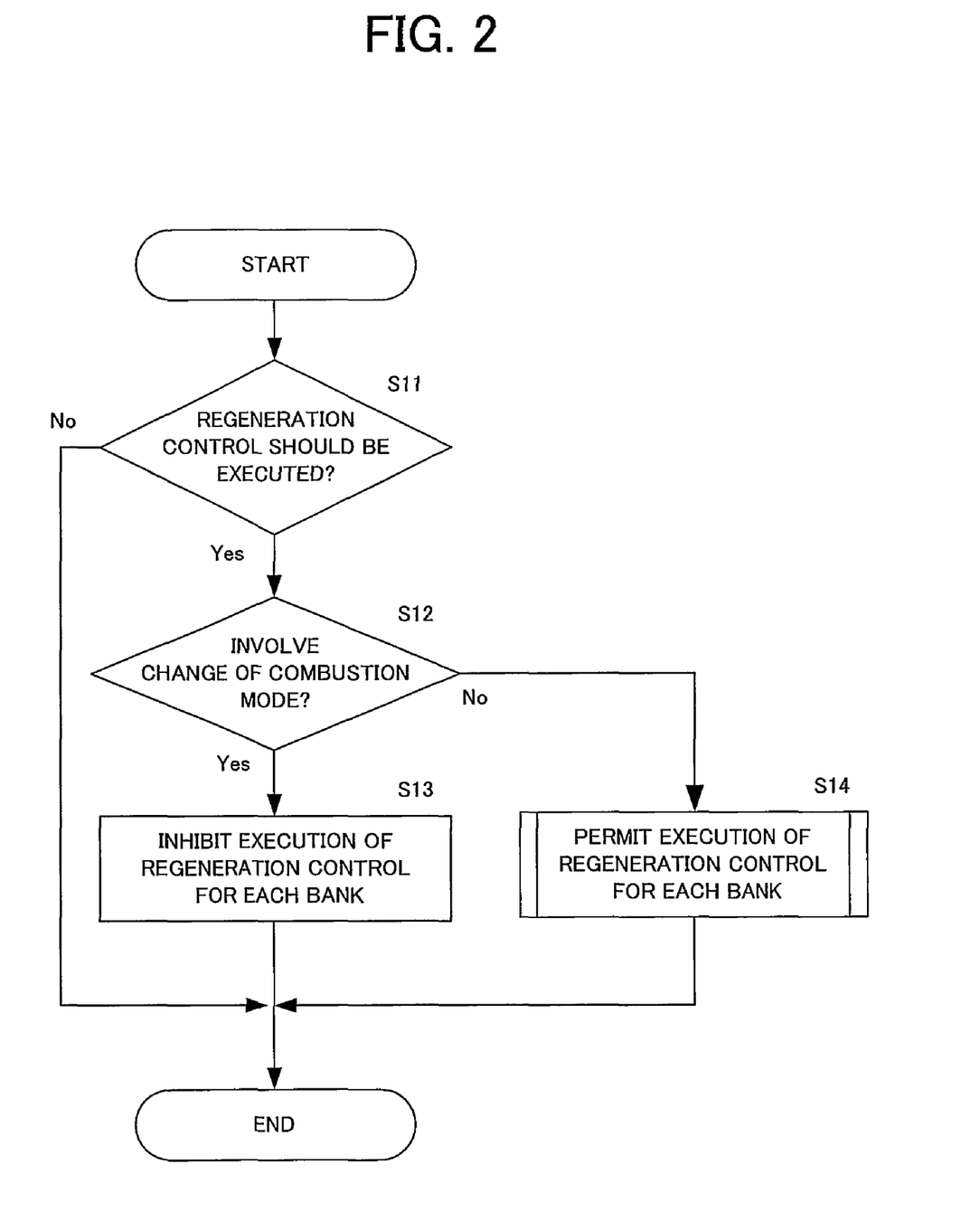
FIG. 2 is a flow chart showing a regeneration control process according to the embodiment of the present invention.

Now, a regeneration control process executed by the ECU 12 will be concretely explained with reference to a flow chart shown in FIG. 2. The regeneration control process is the process executed at the time of the execution of the above-mentioned regeneration control.

First, in step S11, the ECU 12 determines whether or not the regeneration control should be executed for the first exhaust gas purifying units 18L and 18R. Concretely, the ECU 12 determines at least one of the followings: whether or not the NOx reduction should be performed for the NOx catalysts 16L and 16R; whether or not the PM regeneration should be performed for the DPNRs 17L and 17R; and whether or not the S-poisoning recovery should be performed for the NOx catalysts 16L and 16R. In this case, the ECU 12 functions as a regeneration determining unit which executes determination based on the outputs of the various kinds of sensors provided in the internal combustion engine 1.

When the first exhaust gas purifying units 18L and 18R should be regenerated (step S11; Yes), the process goes to step S12. Meanwhile, when the first exhaust gas purifying units 18L and 18R should not be regenerated (step S11; No), the process goes out of the flow.

In step S12, the ECU 12 determines whether or not the change of the combustion mode is involved before and after the execution of the regeneration control. Concretely, the case that the change of the combustion mode is involved is such a case that the change of at least one of the intake air amount introduced to the banks 2L and 2R, the EGR amount (the an EGR gas amount) fed back to the intake-air system, the fuel injection amount generating the power output and the fuel injection timing is involved. Alternatively, it may be determined whether or not the change of the combustion mode is involved based on whether or not the EGR gas passes through the EGR coolers 14L and 14R, i.e., whether or not the EGR gas passes through the by-pass passages without passing through the EGR coolers 14L and 14R.

When the change of the combustion mode is involved (step S12; Yes), the process goes to step S12. Meanwhile, when no change of the combustion mode is involved (step S12; No), the process goes to step S14.

In step S13, the ECU 12 inhibits the execution of the independent regeneration control for each of the banks 2L and 2R. In this case, since the change of the combustion mode is involved before and after the execution of the regeneration control, the ECU 12 simultaneously executes any one of the NOx reduction, the PM regeneration and the S-poisoning recovery for the first exhaust gas purifying units 18L and 18R. Thereby, the first exhaust gas purifying units 18L and 18R can be securely regenerated. When the above process ends, the process goes out of the flow.

In step S14, the ECU 12 permits the independent execution of the regeneration control for each of the banks 2L and 2R. In this case, since no change of the combustion mode is involved before and after the execution of the regeneration control, the ECU 12 independently executes, for each of the first exhaust gas purifying units 18L and 18R, any one of the NOx reduction, the PM regeneration and the S-poisoning recovery as the regeneration control. Thereby, even if the regeneration control is executed, the deterioration of the fuel consumption and drivability of the internal combustion engine 1 can be prevented. When the above-mentioned process ends, the process goes out of the flow.

Next, a description will be given of a concrete example of the process in step S14 of the above-mentioned regeneration control process with reference to a flow chart shown in FIG. 3. The process which will be explained below is executed when the independent execution of the regeneration control for each of the banks 2L and 2R is permitted.

First, in step S101, the ECU 12 determines whether or not both temperatures (bed temperatures) of the first exhaust gas purifying units 18L and 18R are higher than a predetermined temperature. The predetermined temperature indicates a temperature capable of regenerating the first exhaust gas purifying units 18L and 18R. Therefore, when both the bed temperatures of the first exhaust gas purifying units 18L and 18R are higher than the predetermined temperature, the first exhaust gas purifying units 18L and 18R are regenerated. Meanwhile, when the bed temperature of at least one of the bed temperatures of the first exhaust gas purifying units 18L and 18R is equal to or lower than the predetermined temperature, it is necessary to increase the bed temperature of at least one of their temperatures for performing the regeneration of the first exhaust gas purifying units 18L and 18R. As described above, when both the bed temperatures of the first exhaust gas purifying units 18L and 18R are higher than the predetermined temperature (step S101; Yes), the process goes to step S102. When at least one of the bed temperatures of the first exhaust gas purifying units 18L and 18R is equal to or lower than the predetermined temperature (step S101; No), the process goes to step S103.

In step S102, the ECU 12 permits the independent execution of the regeneration control for each of the banks 2L and 2R. In this case, since both the bed temperatures of the first exhaust gas purifying units 18L and 18R are higher than the predetermined temperature, it is unnecessary to increase the temperatures of the first exhaust gas purifying units 18L and 18R, i.e., it is unnecessary to change the combustion modes of both the banks 2L and 2R before and after the execution of the regeneration control. Therefore, the ECU 12 independently executes the regeneration control for each of the first exhaust gas purifying units 18L and 18R. Thereby, the first exhaust gas purifying units 18L and 18R can be securely regenerated. When the above-mentioned process ends, the process goes out of the flow.

On the other hand, in step S103, the ECU 12 inhibits the independent execution of the regeneration control for each of the banks 2L and 2R. In this case, since both the bed temperatures of the first exhaust gas purifying units 18L and 18R are equal to or lower than the predetermined temperature or one of the bed temperatures of the first exhaust gas purifying units 18L and 18R is equal to or lower than the predetermined temperature, it is necessary to increase the bed temperature(s). Namely, when the bed temperature is equal to or lower than the predetermined temperature, it is necessary to change the present combustion mode for increasing the bed temperature. Thus, even when the ECU 12 permits the independent execution of the regeneration control for each of the banks 2L and 2R in the above-mentioned regeneration control process, the ECU 12 inhibits the independent execution of the regeneration control for each of the banks 2L and 2R in step S103. When the above-mentioned process ends, the process goes to step S104.

In step S104, the ECU 12 changes the combustion mode for the purpose of increasing the bed temperatures of the first exhaust gas purifying units 18L and 18R. For example, if the regeneration control is executed when the load of the internal combustion engine 1 is low, since the bed temperatures of the first exhaust gas purifying units 18L and 18R do not become higher than the predetermined temperature, the ECU 12 switches the present combustion mode to the combustion mode for increasing the catalyst bed temperature, which will be referred to as "catalyst bed temperature increasing combustion mode" hereinafter. When the above-mentioned process ends, the process goes out of the flow.

Figure 3:
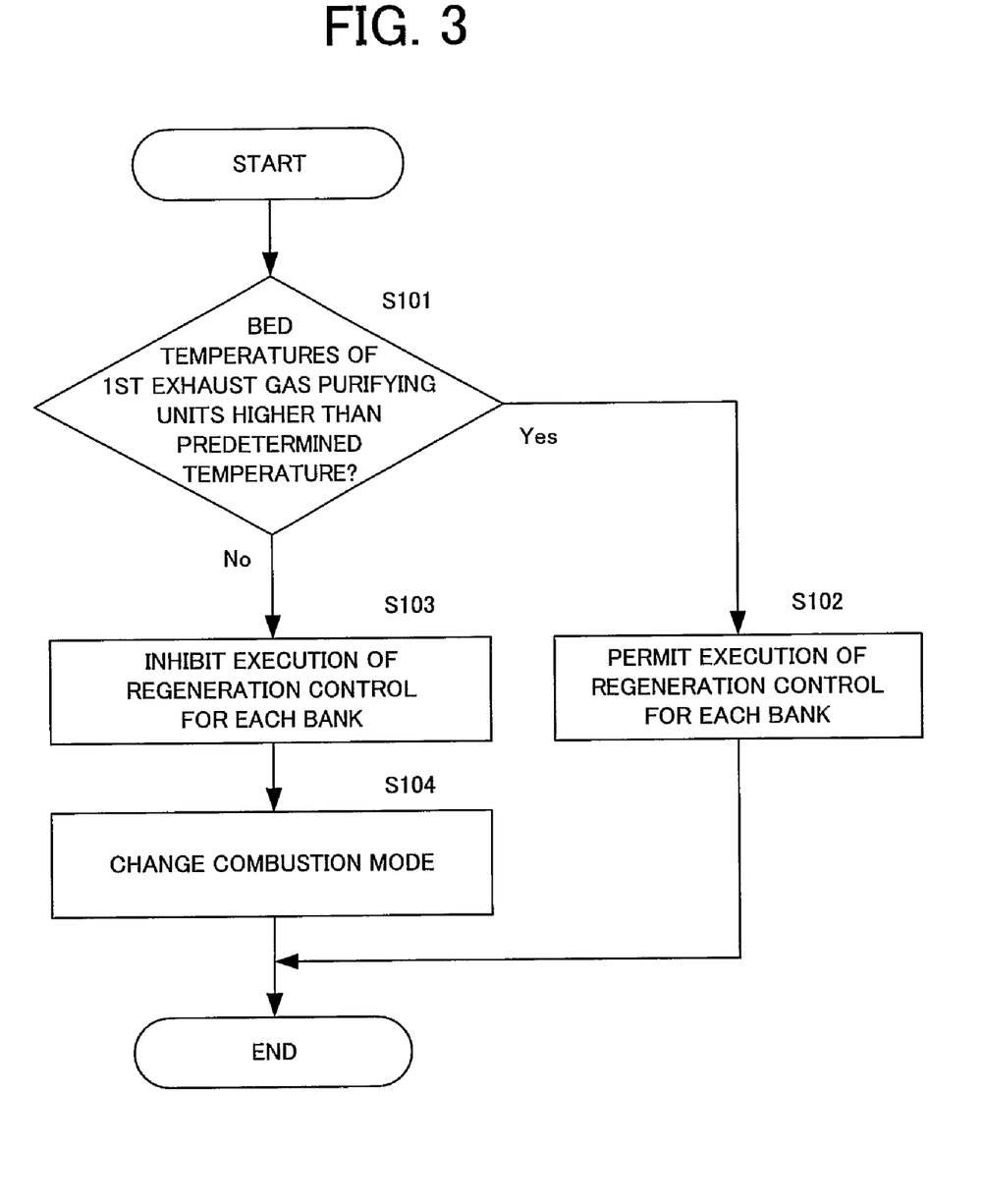
FIG. 3 is a flow chart showing a concrete example of a process in step S14 shown in FIG. 2.

In FIG. 3, the description is given of the example of determining whether or not to execute the regeneration control independently for each of the banks 2L and 2R based on the bed temperatures of the first exhaust gas purifying units 18L and 18R. However, the determination may be performed based on the bed temperatures of the first exhaust gas purifying units 18L and 18R and the load of the internal combustion engine 1. In this case, it can be determined whether or not to independently execute the regeneration control for each of the banks 2L and 2R, based on whether or not such a situation that the load of the internal combustion engine 1 per unit-time is continuously larger than a predetermined amount for a time period equal to or longer than a predetermined time period, or based on whether or not a time period of continuous driving at high speed is longer than a predetermined time period (i.e., whether or not high-speed continuous traveling is performed).

Next, the concrete regeneration control executed by the ECU 12 will be explained in detail.

(1) NOx Reduction

Now, a description will be given of the regeneration control of the NOx reduction executed for the NOx catalysts 16L and 16R.

Based on the air-fuel ratios detected by the air-fuel ratio sensors 25L and 25R or the temperatures of the exhaust gas detected by the exhaust gas temperature sensors 22L and 22R, the ECU 12 calculates the NOx amount stored in each of the NOx catalysts 16L and 16R. When the calculated NOx amount is equal to or larger than the predetermined value, the ECU 12 executes the regeneration control of the NOx reduction. This is because there is high probability that the NOx catalysts 16L and 16R store NOx at the maximum in this case.

Specifically, the ECU 12 executes the regeneration control of adding the fuel from the fuel addition valves 21L and 21R. In this case, based on the detected exhaust gas temperatures and air-fuel ratios, the ECU 12 controls the amount of added fuel or period of adding fuel by the fuel addition valves 21L and 21R.

Further, the ECU 12 can execute the regeneration control of executing post injection or after injection without the power output of the internal combustion engine 1 (i.e., without generation of torque), other than the regeneration control of adding the fuel from the fuel addition valves 21L and 21R. In this case, the ECU 12 executes control of the injection amount or injection interval of the fuel by the fuel injection valve 20. For example, the ECU 12 executes control of shortening the injection interval to increase the temperature of the NOx catalysts 16L and 16R or control of increasing the fuel injection amount to increase the NOx reducing amount (corresponding to the fuel injected by the fuel injection valve 20).

In this manner, since the regeneration control of the NOx reduction can be executed without the change of the combustion mode of the internal combustion engine 1, it can be independently executed for each of the banks 2L and 2R.

(2) PM Regeneration

Next, a description will be given of the regeneration control of the PM regeneration executed for the DPNRs 17L and 17R.

Mainly based on the differential pressures before and after the DPNRs 17L and 17R, detected by the differential pressure sensors 23L and 23R, the ECU 12 calculates the PM amount accumulated in the DPNRs 17L and 17R. When the calculated PM amount is equal to or larger than a predetermined amount, the ECU 12 executes the regeneration control of the PM regeneration. Concretely, based on the detected exhaust gas temperatures and detected air-fuel ratios, the ECU 12 executes the control of adding the fuel from the fuel addition valves 21L and 21R or the control of executing the post injection and/or the after injection.

In this case, when the change of the combustion mode of the internal combustion engine 1 is involved before and after the execution of the above-mentioned regeneration control, the ECU 12 simultaneously executes the regeneration control for the banks 2L and 2R. Concretely, when the present combustion mode is the low temperature combustion mode and the combustion mode has to be changed to the catalyst bed temperature increasing combustion mode to increase the catalyst bed temperature for the regeneration control, the ECU 12 simultaneously executes the regeneration control for the banks 2L and 2R.

On the other hand, when the present combustion mode does not have to be changed to the catalyst bed temperature increasing combustion mode before and after the execution of the regeneration control, or when the temperatures of the DPNRs 17L and 17R can be increased without executing the post injection involving the power output generation, i.e., when the combustion mode is not changed before and after the execution of the regeneration control, the ECU 12 independently executes the regeneration control of the PM regeneration for each of the banks 2L and 2R. This is because, in such a situation, it is possible to easily adjust the explosion torques in the banks 2L and 2R.

(3) S-Poisoning Recovery

Next, a description will be given of the regeneration control of the S-poisoning recovery executed for the NOx catalysts 16L and 16R.

Based on the exhaust gas temperatures detected by the exhaust gas temperature sensors 22L and 22R and the air-fuel ratios detected by the air-fuel ratio sensors 25L and 25R, the ECU 12 calculates the S-poisoning amount in the NOx catalysts 16L and 16R. When the calculated S-poisoning amount is equal to or larger than a predetermined amount, the ECU 12 executes the regeneration control of the S-poisoning recovery. Concretely, based on the detected exhaust gas temperatures and detected air-fuel ratios, the ECU 12 executes the control of adding the fuel from the fuel addition valves 21L and 21R or the control of executing the post injection and/or the after injection.

For executing the S-poisoning recovery, it is necessary to set the NOx catalysts 16L and 16R to temperatures further higher than those of the PM regeneration. While the air-fuel ratio has to be set to a lean state at the time of the PM regeneration, the air-fuel ratio has to be set to a rich state at the time of the S-poisoning recovery. In addition, basically, the frequency of executing S-poisoning recovery is smaller than the frequency of executing the PM regeneration.

From this point of view, in this embodiment, the regeneration control of the S-poisoning recovery is simultaneously executed for the banks 2L and 2R, immediately after the end of the regeneration control of the PM regeneration. Thereby, by making the best use of such a state that the temperatures of the NOx catalysts 16L and 16R are high to some extent after the end of the PM regeneration, the control of further heating the NOx catalysts 16L and 16R is executed. Thus, the S-poisoning recovery can be efficiently executed.

Figure 4:
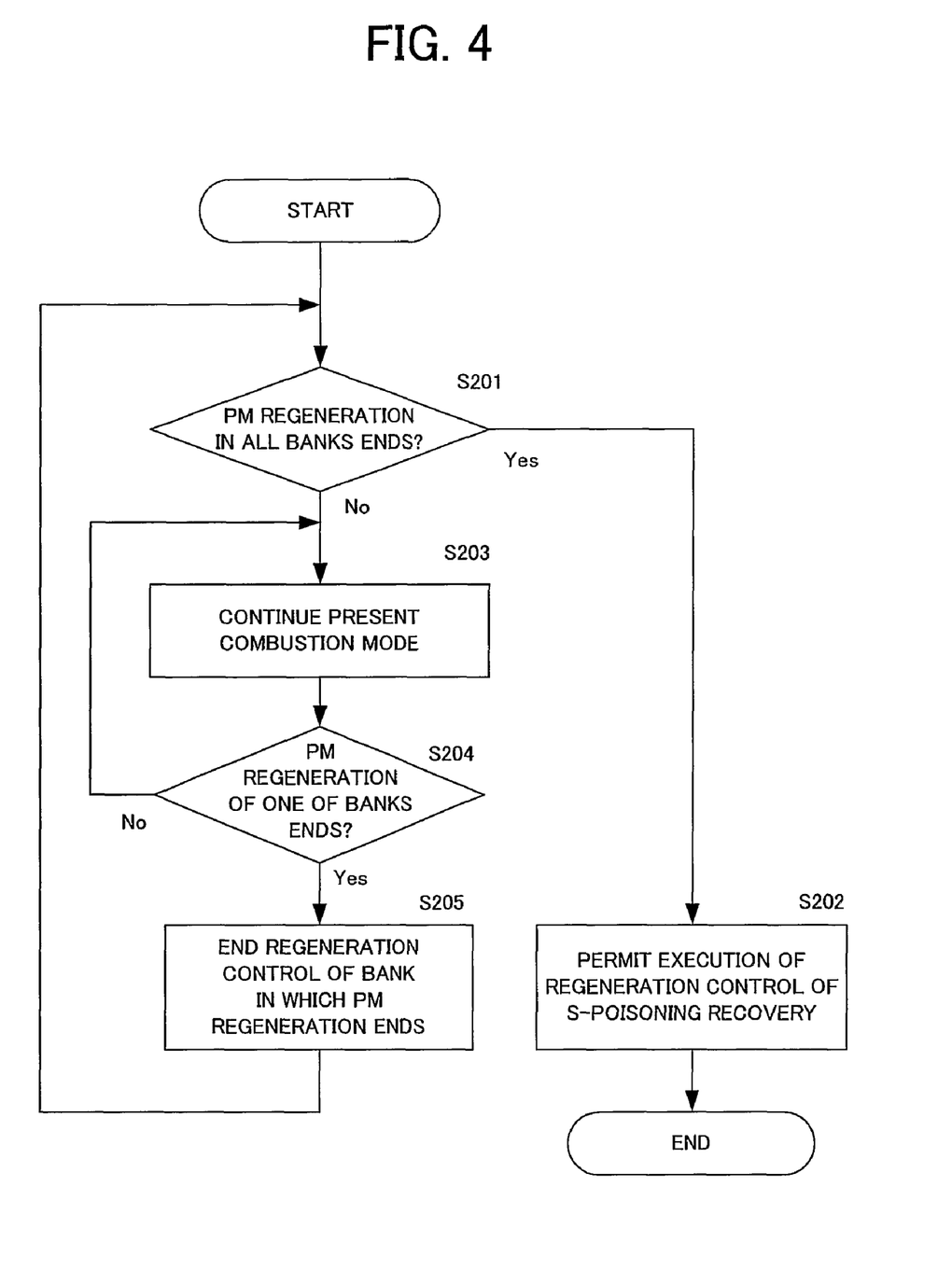
FIG. 4 is a flow chart showing a process executed when it is determined whether or not PM regeneration ends.

The ECU 12 determines whether or not the PM regeneration for both the DPNRs 17L and 17L ends, and executes the regeneration control of the S-poisoning recovery immediately after determining that the PM regeneration ends. This is because the S-poisoning recovery can be securely performed after the PM regeneration for both the DPNRs 17L and 17R ends, even if the accumulated PM amounts in the DPNRs 17L and 17R are different.

Now, a description will be given of a concrete process of the above-mentioned determination of the end of the PM regeneration, with reference to a flow chart shown in FIG. 4. This process is executed while the PM regeneration is currently executed and the S-poisoning recovery is requested.

First, in step S201, the ECU 12 determines whether or not the regeneration controls of the PM regeneration in both the banks 2L and 2R end. Namely, the ECU 12 determines whether or not the PM regeneration for both the DPNRs 17L and 17R ends. In this case, the ECU 12 can determine whether or not the PM regeneration ends based on the air-fuel ratios detected by the air-fuel sensors 25L and 25R. When the PM regeneration of both the banks 2L and 2R ends (step S201; Yes), the process goes to step S202. When the PM regeneration of both the banks 2L and 2R does not end (step S201; No), the process goes to step S203.

In step S202, the ECU 12 permits the execution of the regeneration control of the S-poisoning recovery. In this case, since the PM regeneration for both the DPNRs 17L and 17L has ended, the ECU 12 permits the execution of the regeneration control of the S-poisoning recovery. Then, the process goes out of the flow.

On the other hand, in step S203, the ECU 12 continues the present combustion mode. In this case, since the PM regeneration of at least one of DPNR 17L and 17R have not ended yet, the ECU 12 continuously executes the regeneration control of the PM regeneration with the present combustion mode. Then, the process goes to step S204.

In step S204, the ECU 12 determines whether or not the regeneration control of the PM regeneration of one of the bank 2L and 2R ends. In this case, based on the bed temperatures of the DPNRs 17L and 17R or the air-fuel ratios detected by the air-fuel ratio sensors 25L and 25R, the ECU 12 determines whether or not the PM regeneration ends. When the PM regeneration of one of the bank 2L and 2R ends (step S204; Yes), the process goes to step S205. Meanwhile, when the regeneration of bank neither 2L nor 2R ends (step S204; No), the process goes back to step S203. In this case, the ECU 12 further continuously executes the control in the present combustion mode.

In step S205, the ECU 12 ends the regeneration control for the bank in which the PM regeneration ends. In this case, the ECU 12 does not perform the change to the combustion mode having the probability of torque change and stops the fuel addition or the post injection. Namely, though the ECU 12 ends the regeneration control of the PM regeneration, it does not change the present combustion mode, for the purpose of preventing the deterioration of the fuel consumption. When the above-mentioned process ends, the process goes back to step S201, and the ECU 12 again determines whether or not the PM regeneration of both the banks 2L and 2R ends. In this manner, when the PM regeneration of all the banks ends (step S201; Yes), the regeneration control of the S-poisoning recovery is executed.

The calculating methods of the stored NOx amount, the accumulated PM amount and the S-poisoning amount are not limited to the methods shown in the above paragraphs (1) to (3). For example, the ECU 12 can calculate the stored NOx amount, the accumulating PM amount and the S-poisoning amount by the calculation using a map on the basis of a driving history (e.g., the revolution, load and fuel injection amount of the internal combustion engine 1) and accumulation.

[PM Regeneration Control]

Next, a description will be given of an embodiment of the regeneration control of the PM regeneration.

First Example

First, the regeneration control according to a first embodiment will be explained. The regeneration control according to the first embodiment is executed when the change of the combustion mode is involved. Thus, the control is simultaneously executed for the banks 2L and 2R. Moreover, the regeneration control according to the first embodiment is executed so that the PM regeneration in the banks 2L and 2R simultaneously end. Namely, the regeneration control is executed so that starts and ends of the control in the banks 2L and 2R coincide.

Concretely, based on the PM amount (hereinafter referred to as "estimated PM accumulation amount") accumulated in the DPNRs 17L and 17R, the ECU 12 determines the fuel amount to be added per unit-time (hereinafter simply referred to as "fuel addition amount") for each of the DPNRs 17L and 17R so that the time periods of executing the regeneration control become the same. Further, the ECU 12 also determines the time periods of executing the regeneration control based on the estimated PM accumulation amounts of the DPNRs 17L and 17R. Then, the ECU 12 controls the fuel addition valves 21L and 21R so that the fuel addition amount thus determined is added to the DPNRs 17L and 17R during the predetermined time period. The estimated PM accumulation amount is calculated by a calculation method, which will be explained later.

Now, the regeneration control according to the first embodiment will be explained with reference to FIGS. 5A to 5C.

Figure 5A:
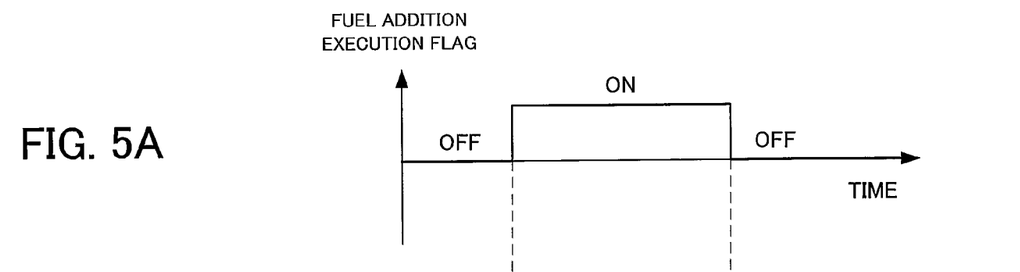
FIGS. 5A to 5C are diagrams for explaining regeneration control according to a first embodiment.
Figure 5B:
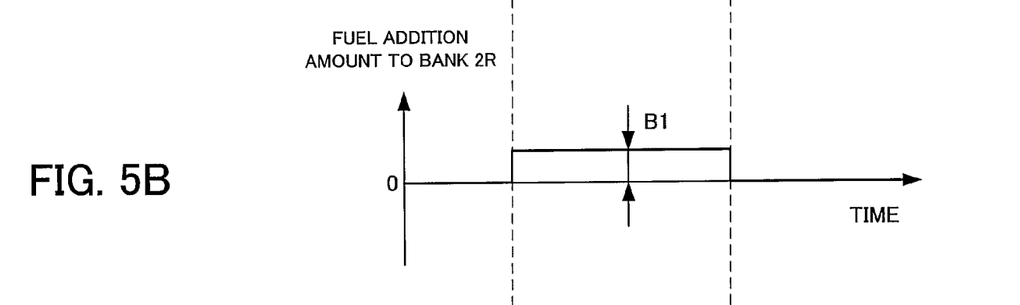
Figure 5C:
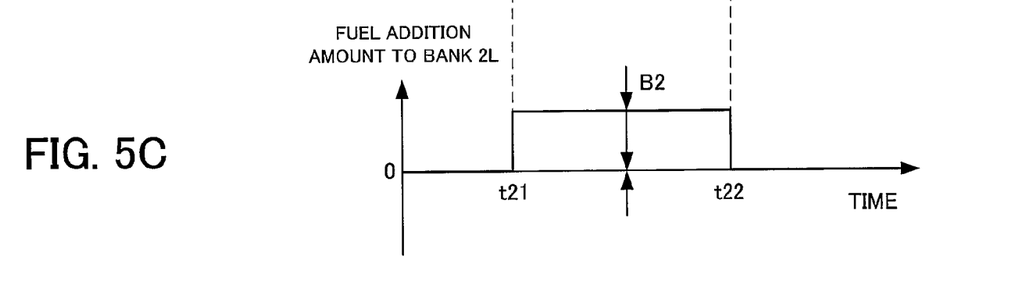

In FIGS. 5A to 5C, horizontal axes show time, respectively. In FIG. 5A, a vertical axis shows ON/OFF state of a "fuel addition execution flag". In FIG. 5B, a vertical axis shows the fuel addition amount by the fuel addition valve 21R in the bank 2R. In FIG. 5C, a vertical axis shows the fuel addition amount by the fuel addition valve 21L in the bank 2L.

The fuel addition execution flag shown in FIG. 5A shows a flag common to the banks 2L and 2R and mainly shows starting time and ending time of the fuel addition to the banks 2L and 2R. The examples shown in FIGS. 5A to 5C show such a case that the estimated PM accumulation amount of the DPNR 17L of the bank 2L is larger than the estimated PM accumulation amount of the DPNR 17R of the bank 2R.

At a time t21, the ECU 12 switches the fuel addition execution flag from OFF to ON to start the fuel addition. In this case, the ECU 12 starts the control so that the fuel of the predetermined amount is added from the fuel addition valves 21L and 21R. Concretely, the ECU 12 executes the control so that the fuel of an amount shown by a reference numeral B1 in FIG. 5B is added from the fuel addition valve 21R and the fuel of an amount shown by a reference numeral B2 in FIG. 5C is added from the fuel addition valve 21L. Based on the estimated PM accumulation amounts of the DPNRs 17R and 17L, the fuel addition amounts B1 and B2 are calculated so that the regeneration control of the banks 2R and 2L simultaneously ends. In this case, since the estimated PM accumulation amount of the DPNR 17L is larger than the estimated PM accumulation amount of the DPNR 17R, the added fuel amount of the bank 2L becomes larger than the added fuel amount of the bank 2R (B1<B2).

In this manner, the fuel added to each of the banks 2L and 2R is changed in accordance with the estimated PM accumulation amount, and thus the fuel addition to the DPNRs 17L and 17R ends at a time t22 after the predetermined time passes. At the same time, the PM regeneration of the DPNRs 17L and 17R ends. Therefore, according to the regeneration control according to the first embodiment, even if the change of the combustion mode is involved before and after the execution of the regeneration control, the regeneration control simultaneously starts and ends in the banks 2L and 2R. Hence, it becomes possible to prevent the fuel consumption of the internal combustion engine 1 and the deterioration of the drivability.

Figure 6:
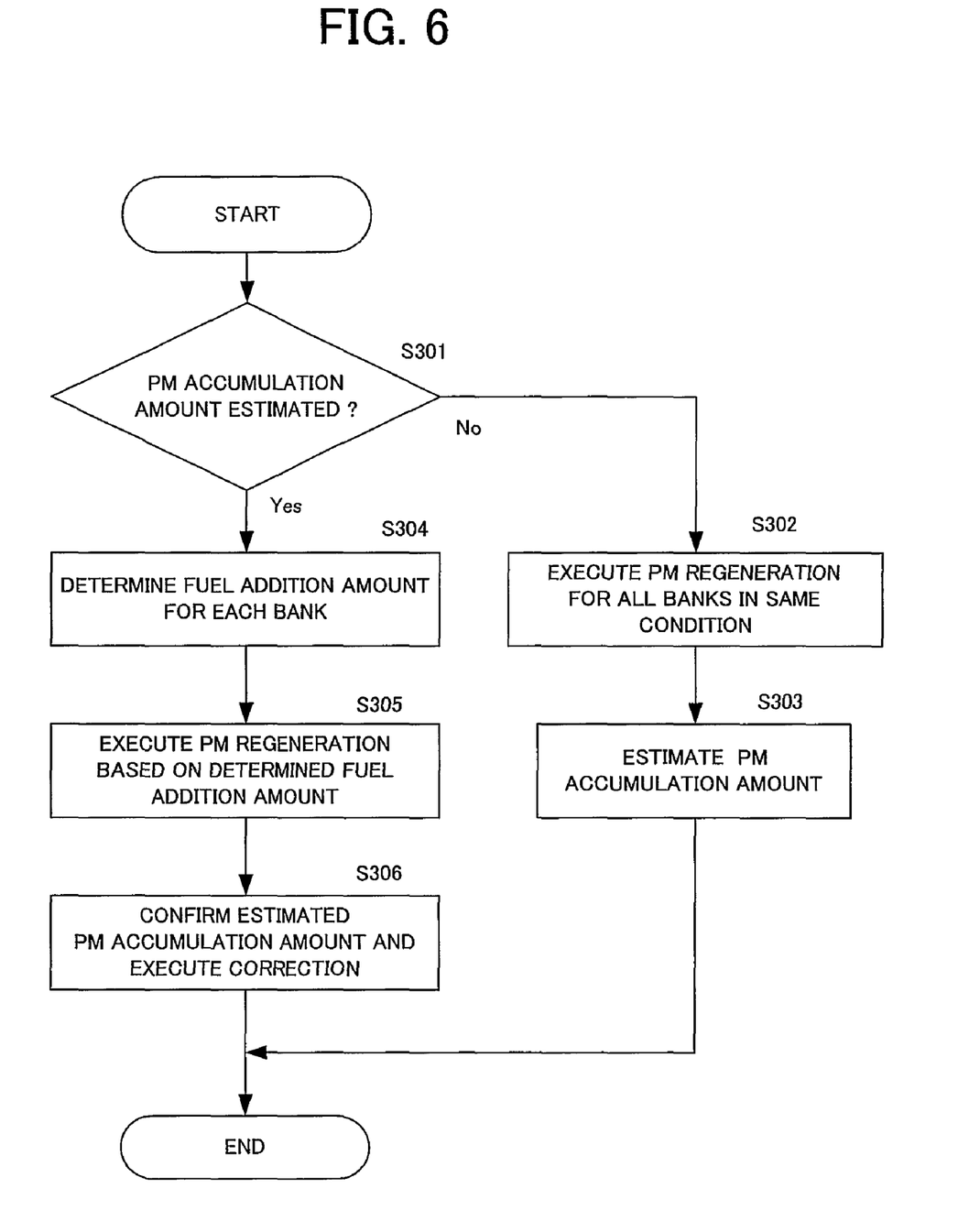
FIG. 6 is a flow chart showing a process executed at the time of the regeneration control according to the PM regeneration.

Now, a description will be given of the concrete process executed in the regeneration control of the PM regeneration with reference to a flow chart shown in FIG. 6.

First, in step S301, the ECU 12 determines whether or not the estimated results of the estimated PM accumulation amount are obtained. When the ECU 12 has the estimated results of the estimated PM accumulation amount (step S301; Yes), the process goes to step S304. When the ECU 12 does not have the estimated results of the estimated PM accumulation amount (step S301; No), the process goes to step S302.

In step S302, the ECU 12 executes the PM regeneration for each of the banks 2L and 2R with the same condition. This is executed in order to estimate the estimated PM accumulation amounts of the DPNRs 17L and 17R in a subsequent process (process in step S303). Concretely, the ECU 12 adds the same fuel amount to the DPNRs 17L and 17R per unit-time. At the same time, the ECU 12 executes the control so that the fuel addition is performed for the same time period. Then, the process goes to step S303.

In step S303, the ECU 12 estimates the estimated PM accumulation amounts of the DPNRs 17L and 17R. Concretely, based on the air-fuel ratios detected by the air-fuel ratio sensors 25L and 25R at the time of the execution of the control shown in step S302, the ECU 12 estimates the estimated PM accumulation amount. When the above-mentioned process ends, the process goes out of the flow.

On the other hand, in step S304, the ECU 12 determines the fuel amount to be added to each of the banks 2L and 2R. In this case, based on the estimated PM accumulation amounts of the DPNRs 17L and 17R, the ECU 12 determines the fuel amounts to be added to the DPNRs 17L and 17R so that the PM regeneration for the DPNRs 17L and 17R simultaneously ends, i.e., so that the time periods for executing the PM regeneration become the same. Then, the process goes to step S305. In step S305, the ECU 12 executes the PM regeneration based on the fuel addition amount determined in step S304. Then, the process goes to step S306.

In step S306, after the end of the PM regeneration, the ECU 12 confirms the estimated PM accumulation amount and corrects the estimated PM accumulation amount. For example, when the PM regeneration of one of the DPNRs takes time longer than the predetermined time (i.e., when the PM regeneration does not end in the same time period), the ECU 12 determines that the estimated PM accumulation amount of the DPNR is smaller than the actual PM accumulation amount, and corrects the estimated PM accumulation amount to a larger value. When the above-mentioned process ends, the process goes out of the flow.

Actually, the bed temperatures of the DPNRs 17L and 17R, the added fuel amounts to the DPNRs 17L and 17R and the fuel addition periods become functions of the estimated PM accumulation amount. Therefore, by calculating the bed temperatures (hereinafter also referred to as "target bed temperatures") to be set in the DPNRs 17L and 17R so that the time periods for executing the PM regeneration become the same based on the estimated PM accumulation amounts of the DPNRs 17L and 17R, a rich spike period (i.e., fuel addition period) and a rich spike depth (corresponding to the fuel addition amount) can be determined based on the target bed temperatures. For example, when a reference target bed temperature is 650° C., the ECU 12 sets the target bed temperature for the DPNR having the large estimated PM accumulation amount to 670° C., and sets the target bed temperature for the DPNR having the small estimated PM accumulation amount to 600° C. to 620° C. In this case, it is possible to set the short rich spike period and the shallow rich spike (small fuel addition amount) to the DPNR having the large estimated PM accumulation amount.

Second Embodiment

Next, a description will be given of the regeneration control according to a second embodiment. The regeneration control according to the second embodiment is also executed when the change of the combustion mode is involved, and hence the regeneration control is simultaneously executed for the banks 2L and 2R. Moreover, similarly to the regeneration control according to the first embodiment, the regeneration control according to the second embodiment is executed so that the PM regeneration simultaneously ends in the banks 2L and 2R.

The regeneration control according to the second embodiment is different from the regeneration control according to the first embodiment in that, not the fuel addition amount, but the exhaust gas amount supplied to the DPNRs 17L and 17R (i.e., the exhaust gas amount supplied per unit-time) is changed. Namely, changing the supplied exhaust gas amount makes the progressing speed of the PM regeneration in the DPNRs 17L and 17R different. Specifically, based on the estimated PM accumulation amounts of the DPNRs 17L and 17R, the ECU 12 determines the exhaust gas amount to be supplied to the banks 2L and 2R so that the time periods for executing the regeneration control become the same. Further, based on the estimated PM accumulation amounts of the DPNRs 17L and 17R, the ECU 12 also determines the time period for executing the regeneration control. The ECU 12 controls the nozzle opening degrees (hereinafter simply referred to as "VN turbo opening degrees") of the turbo chargers 6L and 6R so that the exhaust gas thus determined flows into the DPNRs 17L and 17R during the predetermined time period.

Now, the regeneration control according to the second embodiment will be explained with reference to FIGS. 7A to 7C.

Figure 7A:
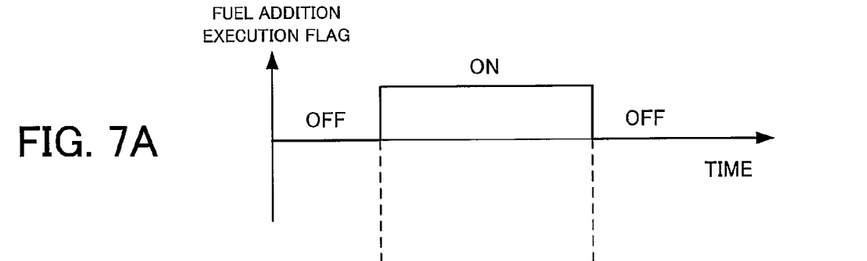
FIGS. 7A to 7C are diagrams for explaining regeneration control according to a second embodiment.
Figure 7B:
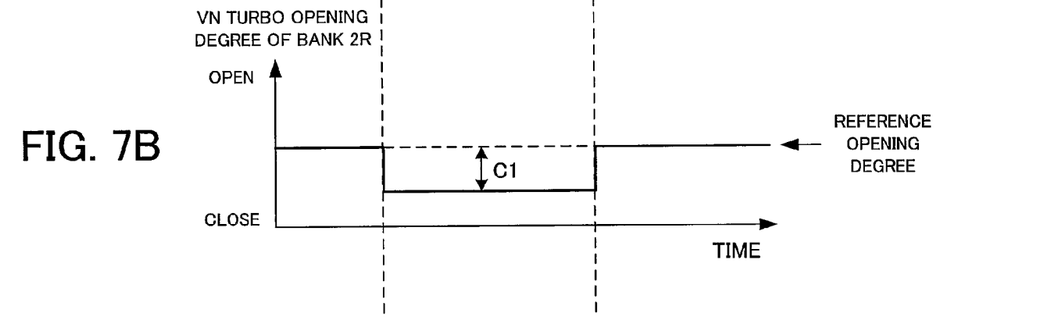
Figure 7C:
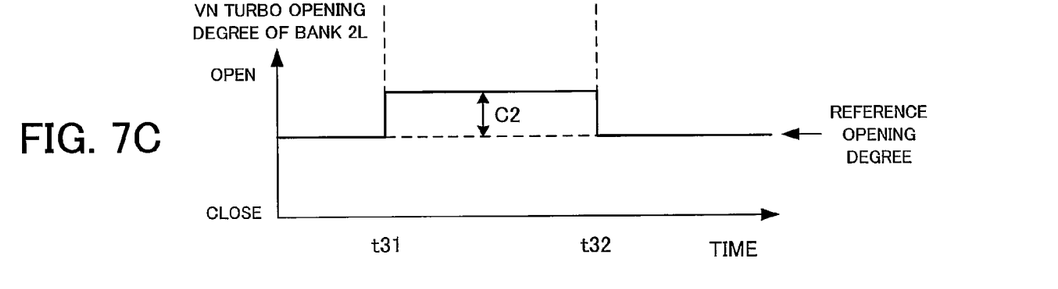

In FIGS. 7A to 7C, horizontal axes show time, respectively. In FIG. 7A, a vertical axis shows the ON/OFF state of the fuel addition execution flag. In FIG. 7B, a vertical axis shows the VN turbo opening degree of the turbo charger 6R in the bank 2R. In FIG. 7C, a vertical axis shows the VN turbo opening degree of the turbo charger 6L in the bank 2L. The fuel addition execution flag shown in FIG. 7A shows the flag common to the banks 2L and 2R, and mainly shows the starting time and ending time of the fuel addition to the banks 2L and 2R. In the examples shown in FIGS. 7A to 7C, there is shown such a case that the estimated PM accumulation amount of the DPNR 17L of the bank 2L is larger than the estimated PM accumulation amount of the DPNR 17R of the bank 2R.

At a time t31, the ECU 12 switches the fuel addition execution flag from the OFF state to the ON state, and starts the fuel addition. In this case, the ECU 12 starts the control so that the fuel is added from the fuel addition valves 21L and 21R. Moreover, the ECU 12 sets the VN turbo opening degree so that the VN turbo opening degree becomes smaller than the reference opening degree by an amount shown by a reference numeral C1 in FIG. 7B, and sets the VN turbo opening degree so that the VN turbo opening degree becomes larger than the reference opening degree by an amount shown by a reference numeral C2 in FIG. 7C. The VN turbo opening degrees of the turbo chargers 6L and 6R are calculated from the estimated PM accumulation amounts of the DPNRs 17L and 17R so that the regeneration control of the banks 2L and 2R simultaneously ends. In this case, since the estimated PM accumulation amount of the DPNR 17L is larger than the estimated PM accumulation amount of the DPNR 17R, the VN turbo opening degree of the turbo charger 6L is set to the value larger than that of the turbo charger 6R. Therefore, since the supplied exhaust gas amount of the DPNR 17L becomes larger than that of the DPNR 17R, the supplied fuel and air (oxygen) amounts of the DPNR 17L become larger than those of the DPNR 17R. As a result, the PM regeneration in the DPNR 17L progresses faster than that in the DPNR 17R.

In this manner, by changing the exhaust gas amount supplied to each of the DPNRs 17L and 17R in accordance with the estimated PM accumulation amounts, the fuel addition to the DPNRs 17L and 17R ends at the time t32 after the passage of the predetermined time period, and the PM regeneration of the DPNRs 17L and 17R ends at the same time. Therefore, according to the regeneration control of the second embodiment, the regeneration control simultaneously starts and ends in the banks 2L and 2R even if the change of the combustion mode is involved before and after the execution of the regeneration control. Hence, it becomes possible to prevent the fuel consumption of the internal combustion engine 1 and the deterioration of the drivability.

In the above-mentioned embodiment, there is shown such an example that only the exhaust gas amount supplied to the DPNRs 17L and 17R is changed. However, not only the exhaust gas amount supplied to the DPNRs 17L and 17R but also the fuel addition amount may be simultaneously changed, as shown in the first embodiment. In this case, in accordance with the estimated PM accumulation amount of each of the DPNRs 17L and 17R, the ECU 12 may determine the exhaust gas amounts supplied to control the VN turbo opening degrees of the turbo chargers 6L and 6R and the fuel amounts added by the fuel addition valves 21L and 21R for each of the banks 2L and 2R.

Third Embodiment

Next, a description will be given of the regeneration control according to a third embodiment.

The regeneration control according to the third embodiment is different from the above-mentioned regeneration control according to the first and second embodiments. The regeneration control according to the third embodiment is executed in such a case that no change of the combustion mode is involved before and after the execution of the regeneration control. Concretely, in the third embodiment, the regeneration control simultaneously starts for the banks 2L and 2R, and the same fuel amount is added to the DPNRs 17L and 17R per unit-time. In this case, based on the estimated PM accumulation amount of each of the DPNRs 17L and 17R, the ECU 12 determines the time period for executing the regeneration control for each of them, respectively. Namely, during the determined time period, the ECU 12 executes the regeneration control for each of the DPNRs 17L and 17R. In this manner, the regeneration control ends earlier in the DPNR having the smaller estimated PM accumulation amount.

Now, the regeneration control according to the third embodiment will be explained with reference to FIGS. 8A to 8D.

Figure 8A:
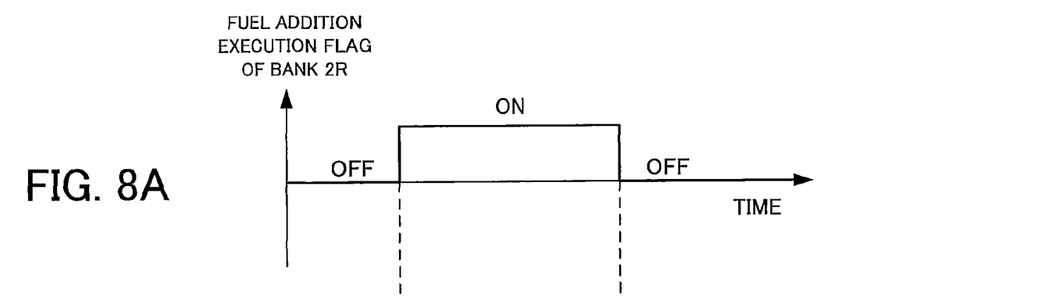
FIGS. 8A to 8D are diagrams for explaining regeneration control according to a third embodiment.
Figure 8B:
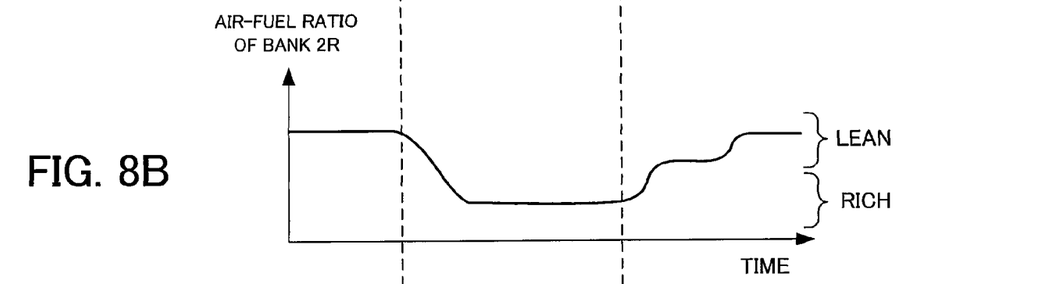
Figure 8C:
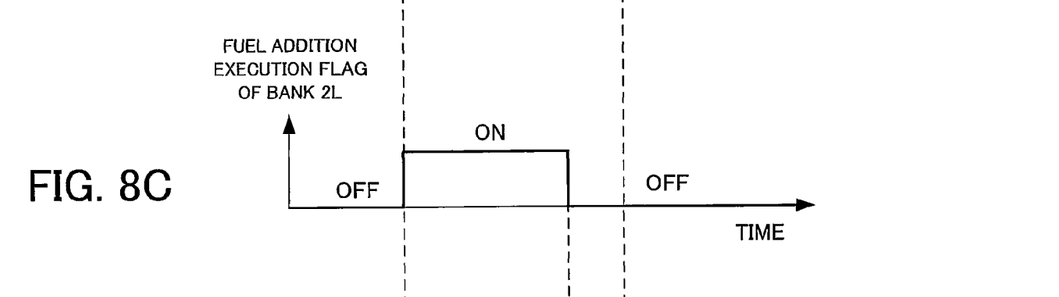
Figure 8D:
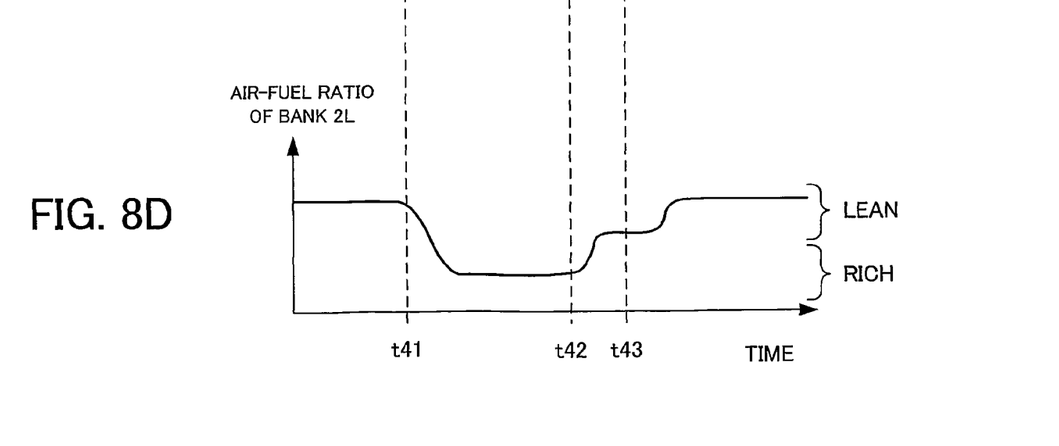

In FIGS. 8A to 8D, horizontal axes show time, respectively. In FIG. 8A, a vertical axis shows the ON/OFF state of the fuel addition execution flag in the bank 2R. In FIG. 8B, a vertical axis shows the air-fuel ratio in the bank 2R. In FIG. 8C, a vertical axis shows the ON/OFF state of the fuel addition execution flag in the bank 2L. In FIG. 8D, a vertical axis shows the air-fuel ratio in the bank 2L. The fuel addition execution flag shown in FIG. 8A shows the starting time and ending time of the fuel addition to the bank 2R, and the fuel addition execution flag shown in FIG. 8C shows the starting time and ending time of the fuel addition to the bank 2L. In the examples shown in FIGS. 8A to 8D, there is shown such a case that the estimated PM accumulation amount of the DPNR 17L of the bank 2L is smaller than the estimated PM accumulation amount of the DPNR 17R of the bank 2R.

As shown in FIGS. 8A and 8C, the ECU 12 controls the fuel addition valves 21L and 21R and adds the fuel at a time t41. Concretely, the ECU 12 simultaneously adds the same fuel amount to the banks 2L and 2R. That is, the ECU 12 adds the same fuel amount to the DPNRs 17L and 17R per unit-time. When the fuel is added in this manner, the PMs in the DPNRs 17L and 17R are combusted, and the air-fuel ratios detected from the air-fuel ratio sensors 25R and 25L change to the rich state from the lean state as shown in FIGS. 8B and 8D.

The ECU 12 executes the control so that the fuel is added to each of the DPNRs 17L and 17R during the predetermined time period. Concretely, the ECU 12 executes the control for the DPNR 17R so that the fuel is added from the time t41 to the time t43 after the passage of the predetermined time period. Meanwhile, the ECU 12 executes the control for the DPNR 17L so that the fuel is added from the time t41 to the time t42 after the passage of the predetermined time period. Therefore, the air-fuel ratio is shifted to the lean side at the time t43 as shown in FIG. 8B, and the air-fuel ratio is shifted to the lean side at the time t42 as shown in FIG. 8D. In this manner, when the PMs in the DPNRs 17L and 17R are entirely combusted, the oxygen in the exhaust gas is not used for combusting the PMs, and hence the air-fuel ratio is shifted to the lean side at the time when the PM regeneration ends. Therefore, the PMs of the DPNR 17L are entirely combusted at the time t42, and the PMs of the DPNR 17R are entirely combusted at the time t43 which is after the time t42. Namely, there generation control of the DPNR 17L ends earlier than the regeneration control of the DPNR 17R. This is because the same fuel amount is added to the DPNRs 17L and 17R and the estimated PM accumulation amount of the DPNR 17L is smaller than the estimated PM accumulation amount of the DPNR 17R.

In this manner, according to the regeneration control of the third embodiment, the time for executing the regeneration control is changed in accordance with the estimated PM accumulation amounts of the DPNRs 17L and 17R. Thus, the appropriate regeneration control can be effectively executed for each of the DPNRs 17L and 17R. Thereby, it becomes possible to securely execute the regeneration control for each of the DPNRs 17L and 17R without waste.

[Estimation Method of Estimated PM Accumulation Amount]

A description will be given of an estimation method of the estimated PM accumulation amount of the DPNRs 17L and 17R used for the above-mentioned regeneration control, below. The estimation of the estimated PM accumulation amount is executed by the ECU 12 functioning as an estimation unit.

First, a method of determining the end of the PM regeneration will be explained with reference to FIGS. 9A to 9C.

As described above, since the temperatures of the NOx catalysts 16L and 16R have to be set to comparatively high temperatures for the S-poisoning recovery, the regeneration control of the S-poisoning recovery is executed after the end of the PM regeneration. Thus, in this embodiment, the ECU 12 determines whether or not the PM regeneration for both the DPNRs 17L and 17R ends. After determining the end of the PM regeneration for both the DPNRs 17L and 17R, the ECU 12 executes the regeneration control of the S-poisoning recovery.

Figure 9A:
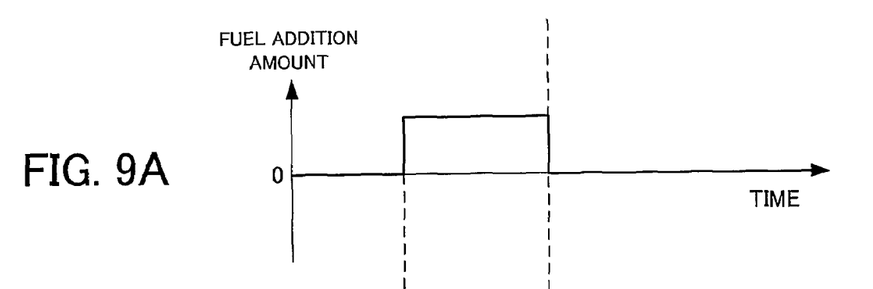
FIGS. 9A to 9C are diagrams for explaining an estimation method of an estimated PM accumulation amount.
Figure 9B:
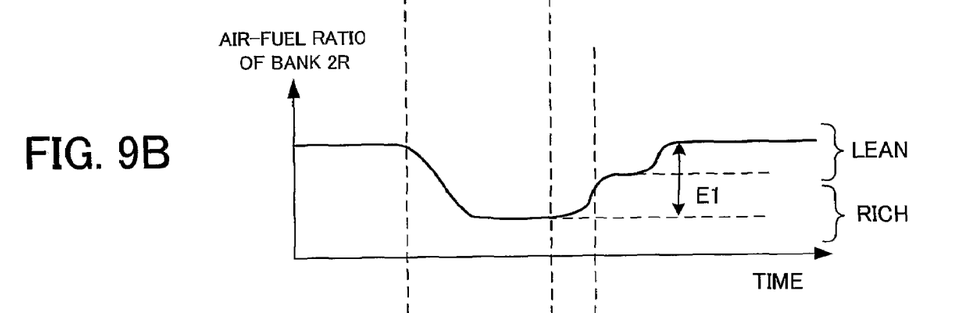
Figure 9C:
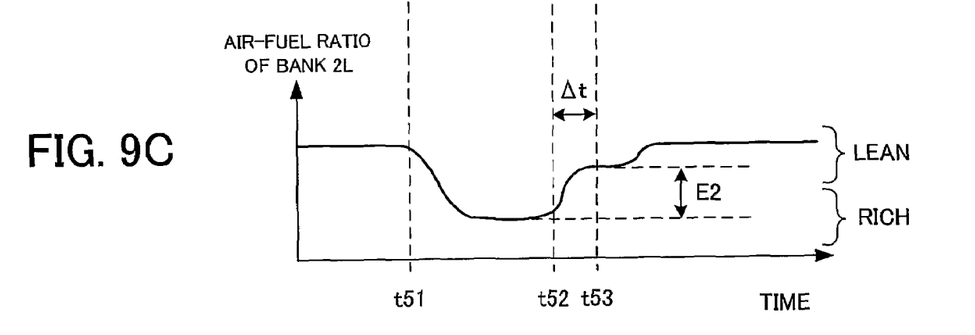

In FIGS. 9A to 9C, horizontal axes show time, respectively. In FIG. 9A, a vertical axis shows the fuel addition amount. In FIG. 9B, a vertical axis shows the air-fuel ratio detected from the air-fuel ratio sensor 25R in the bank 2R. In FIG. 9C, a vertical axis shows the air-fuel ratio detected from the air-fuel ratio sensor 25L in the bank 2L. FIG. 9A shows the fuel amount added to both the banks 2L and 2R. Namely, the same fuel amount is added to the DPNRs 17L and 17R.

As shown in FIG. 9A, at a time t51, the ECU 12 controls the fuel addition valves 21L and 21R to add the fuel. Concretely, the ECU 12 simultaneously adds the same fuel amount to the banks 2L and 2R. When the fuel is added, the PMs in the DPNRs 17L and 17R are combusted, and the air-fuel ratios detected from the air-fuel ratio sensors 25R and 25L change to the rich state from the lean state, as shown in FIGS. 9B and 9C. This is because the oxygen in the exhaust gas is used for the combustion of the PMs to be little.

When the PMs in the DPNRs 17L and 17R are entirely combusted, since the oxygen in the exhaust gas is not used for the combustion of the PMs and is increased, the air-fuel ratio is shifted to the lean side. In this case, it is understood that the PMs in the bank 2R are entirely combusted at the time t53 and the PMs in the bank 2L are entirely combusted at the time t52. In this case, a difference of the times necessary for the PM regeneration of the banks 2R and 2L becomes $\Delta t$ shown in FIG. 9C. Namely, there is a difference between the estimated PM accumulation amount of the DPNR 17L of the bank 2L and the estimated PM accumulation amount of the DPNR 17R of the bank 2R by an amount corresponding to $\Delta t$. Concretely, the estimated PM accumulation amount of the DPNR 17L is smaller than the estimated PM accumulation amount of the DPNR 17R by the amount corresponding to $\Delta t$.

In this manner, the ECU 12 detects the timing at which the outputs of the air-fuel ratio sensors 25L and 25R are shifted from the rich state to the lean state to determine the end of the PM regeneration. Thereby, the ECU 12 can accurately determine whether or not the PM regeneration of both the DPNRs 17L and 17R ends. Therefore, the ECU 12 can securely execute the regeneration control of the S-poisoning recovery after the end of the PM regeneration for both the DPNRs 17L and 17R.

Next, a description will be given of the estimation method of the estimated PM accumulation amounts of the DPNRs 17L and 17R.

The estimated PM accumulation amounts of the DPNRs 17L and 17R are estimated by executing the control similar to the above-mentioned control. Namely, the ECU 12 simultaneously adds the same fuel amount to the DPNRs 17L and 17R, and estimates the estimated PM accumulation amounts based on the air-fuel ratios outputted from the air-fuel ratio sensors 25L and 25R at this time.

In the examples shown in FIGS. 9A to 9C, in the DPNR 17R, the air-fuel ratio detected by the air-fuel ratio sensor 25R is shifted by E1 (hereinafter referred to as "shift width") at the time t53 (at the time of the end of the PM regeneration). In the DPNR 17L, the shift width becomes E2 at the time t52 (at the time of the end of the PM regeneration). The shift widths of the air-fuel ratios at the time of entirely combusting the PMs are values showing the estimated PM accumulation amounts of the DPNRs 17L and 17R.

The ECU 12 calculates the estimated PM accumulation amount by using such a shift width. Concretely, the ECU 12 can calculate the estimated PM accumulation amount by using an equation (1) expressed below. A value "k1" in the equation (1) shows a constant preset by the ECU 12 in advance.

$$(\text{Estimated } PM \text{ accumulation amount}) = (\text{shift width}) \times \\ (\text{time period necessary for actual regeneration control}) \times \\ (\text{intake air amount}) \times k1 \quad (1)$$

Further, the ECU 12 can calculate the estimated PM accumulation amount by an equation (2) expressed below by using the bed temperatures of the DPNRs 17L and 17R, instead of the above equation (1).

$$(\text{Estimated } PM \text{ accumulation amount}) = \\ (\text{actual temperature} - \text{reference temperature}) \times \\ (\text{time period necessary for actual regeneration control}) \times \\ (\text{intake air amount}) \times k2 \quad (2)$$

The "actual temperature" in the equation (2) shows the bed temperatures of the DPNRs 17L and 17R at the time when the PMs are entirely combusted. The bed temperature may be detected by various kinds of sensors or may be estimated. In addition, the "k2" and the "reference temperature" are values set by the ECU 12.

A value corrected in advance in consideration of the difference of the intake air amounts between the banks has to be used for the intake air amount substituted in the equation (1) or the equation (2).

In addition, the ECU 12 executes the estimation of the estimated PM accumulation amounts in the DPNRs 17L and 17R before the execution of the above-mentioned regeneration control and in the early stage immediately after the driving start of the internal combustion engine 1.

Moreover, the present invention is not limited to the estimation of the estimated PM accumulation amounts of the DPNRs 17L and 17R and the execution of the regeneration control on the basis of the estimated PM accumulation amounts of the DPNRs 17L and 17R. Instead of using the estimated PM accumulation amounts of the DPNRs 17L and 17R, the difference between the estimated PM accumulation amounts of the DPNRs 17L and 17R may be calculated from the difference $\Delta t$ of the time necessary for the PM regeneration of the above-mentioned banks 2R and 2L, and the fuel amount added to the DPNRs 17L and 17R or the supplied exhaust gas amount shown in the above first to third embodiments may be calculated by using the difference between the estimated PM accumulation amounts of the DPNRs 17L and 17R. Thereby, the regeneration control may be executed.

INDUSTRIAL APPLICABILITY

This invention is applicable to an exhaust gas purifying apparatus for an internal combustion engine used for a movable body such as vehicle.

The invention claimed is:

1. An exhaust gas purifying apparatus for an internal combustion engine comprising:
    plural exhaust gas purifying units which are provided on exhaust gas passages connected to plural cylinder groups in the internal combustion engine and purify exhaust gas flowing in the exhaust gas passages;
    a regeneration determining unit which determines whether or not the plural exhaust gas purifying units are to be regenerated; and
    a regeneration control unit which executes regeneration control for regenerating the exhaust gas purifying units when the regeneration determining unit determines that the exhaust gas purifying units are to be regenerated,
    wherein the regeneration control unit simultaneously executes the regeneration control for the plural exhaust gas purifying units in a case that a change of a combustion mode of the internal combustion engine is involved before and after execution of the regeneration control, and independently executes the regeneration control for each of the plural exhaust gas purifying units in a case that the change of the combustion mode is not involved before and after the execution of the regeneration control.

2. The exhaust gas purifying apparatus for the internal combustion engine according to claim 1, wherein the case that the change of the combustion mode is involved is a case that at least one of an intake air amount introduced to the cylinder groups, an EGR amount fed back to an intake-air system, an fuel injection amount generating output power and a fuel injection timing is changed.

3. The exhaust gas purifying apparatus for the internal combustion engine according to claim 1, wherein the regeneration control unit executes at least one of reduction of NOx stored by the exhaust gas purifying units, regeneration of PMs accumulating in the exhaust gas purifying units and sulfur poisoning recovery in the exhaust gas purifying units.

4. The exhaust gas purifying apparatus for the internal combustion engine according to claim 1, wherein the regeneration control unit determines whether or not the regeneration of the PM ends for each of the plural exhaust gas purifying units, and executes the sulfur poisoning recovery when it is determined that the regeneration of the PM ends in all the exhaust gas purifying units.

5. The exhaust gas purifying apparatus for the internal combustion engine according to claim 3, further comprising an estimation unit which estimates a PM amount accumulating in each of the plural exhaust gas purifying units,
    wherein the regeneration control unit determines a control amount based on an estimated PM amount, so that time periods for executing the regeneration control for the plural exhaust gas purifying units become same.

6. The exhaust gas purifying apparatus for the internal combustion engine according to claim 5, wherein the control amount is at least a reducing agent amount added to each of the plural exhaust gas purifying units or an exhaust gas amount supplied to each of the plural exhaust gas purifying units.

* * * * *